(12) United States Patent
Smith

(10) Patent No.: US 11,405,671 B2
(45) Date of Patent: Aug. 2, 2022

(54) CAPTURING INFORMATION USING SET-TOP BOX FOR ADVERTISING INSERTION AND/OR OTHER PURPOSES

(71) Applicant: CommScope Technologies LLC, Hickory, NC (US)

(72) Inventor: Trevor D. Smith, Eden Prairie, MN (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/676,168

(22) Filed: Nov. 6, 2019

(65) Prior Publication Data

US 2020/0145707 A1 May 7, 2020

Related U.S. Application Data

(60) Provisional application No. 62/756,962, filed on Nov. 7, 2018.

(51) Int. Cl.
| | | |
|---|---|---|
| *H04N 21/25* | (2011.01) | |
| *H04N 21/81* | (2011.01) | |
| *H04N 21/234* | (2011.01) | |
| *H04N 21/422* | (2011.01) | |
| *H04N 21/4223* | (2011.01) | |
| *H04N 21/442* | (2011.01) | |
| *H04N 21/258* | (2011.01) | |

(52) U.S. Cl.
CPC ..... *H04N 21/252* (2013.01); *H04N 21/23424* (2013.01); *H04N 21/25891* (2013.01); *H04N 21/4223* (2013.01); *H04N 21/42201* (2013.01); *H04N 21/42203* (2013.01); *H04N 21/44218* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 10,171,877 B1* | 1/2019 | Shah | H04N 21/812 |
| 2003/0067554 A1* | 4/2003 | Klarfeld | H04N 5/76 |
| | | | 725/135 |
| 2005/0251820 A1* | 11/2005 | Stefanik | H04N 21/812 |
| | | | 725/34 |
| 2009/0172728 A1* | 7/2009 | Shkedi | G06Q 30/02 |
| | | | 725/34 |
| 2012/0110071 A1* | 5/2012 | Zhou | G06Q 30/02 |
| | | | 709/204 |
| 2012/0159546 A1* | 6/2012 | Klein | H04M 1/72533 |
| | | | 725/40 |
| 2012/0233638 A1 | 9/2012 | Slaney et al. | |

(Continued)

OTHER PUBLICATIONS

International Searching Authority, "International Search Report and Written Opinion from PCT Application No. PCT/US2019/060103", from Foreign Counterpart to U.S. Appl. No. 16/676,168, dated Apr. 8, 2020, pp. 1 through 13, Published: WO.

*Primary Examiner* — Alexander Q Huerta
(74) *Attorney, Agent, or Firm* — Panitch Schwarze Belisario & Nadel LLP

(57) ABSTRACT

Various embodiments of how information about viewers of content provided via a set-top box can be captured, used to identify one or more of the viewers, and insert advertising into content viewed using the set-top box. The captured information can be used for other purposes.

61 Claims, 6 Drawing Sheets

(56) References Cited

U.S. PATENT DOCUMENTS

| | | | |
|---|---|---|---|
| 2012/0304206 A1* | 11/2012 | Roberts | H04H 60/33 |
| | | | 725/12 |
| 2013/0254669 A1 | 9/2013 | Shaphy et al. | |
| 2013/0267171 A1* | 10/2013 | Sarkar | H04B 7/24 |
| | | | 455/41.1 |
| 2013/0283162 A1* | 10/2013 | Aronsson | G11B 27/105 |
| | | | 715/719 |
| 2014/0245335 A1* | 8/2014 | Holden | H04N 21/44218 |
| | | | 725/12 |
| 2015/0237395 A1* | 8/2015 | Barney | H04H 60/31 |
| | | | 725/14 |
| 2015/0296239 A1* | 10/2015 | Burger | H04N 21/2668 |
| | | | 725/12 |
| 2016/0088332 A1* | 3/2016 | Lind | H04N 21/44224 |
| | | | 725/14 |
| 2016/0227280 A1* | 8/2016 | Candelore | H04N 21/4755 |
| 2018/0041792 A1 | 2/2018 | Shkedi | |
| 2018/0103295 A1* | 4/2018 | Klappert | H04N 21/4826 |
| 2018/0146228 A1 | 5/2018 | Shkedi | |
| 2018/0270526 A1 | 9/2018 | Nguyen et al. | |
| 2018/0310060 A1* | 10/2018 | Zavesky | H04N 21/44218 |
| 2018/0316966 A1* | 11/2018 | Krieger | H04N 21/258 |

* cited by examiner

CAPTURING INFORMATION USING SET-TOP BOX FOR ADVERTISING INSERTION AND/OR OTHER PURPOSES

CROSS-REFERENCE TO RELATED APPLICATION

This application claims the benefit of U.S. Provisional Patent Application Ser. No. 62/756,962, filed on Nov. 7, 2018, which is hereby incorporated herein by reference.

BACKGROUND

A set-top box (also referred to as a "set-top unit" or "cable box") is a device that includes, among other features, a network interface to couple the device to a network over which content is supplied to the device, a television tuner that is configured to select a particular "channel" (or other unit of content), and a television interface to output the selected channel for display on a television (or other display) to which the device is connected. Examples of content include video content such as television shows and movies and audio content such as news and music. The content has historically been arranged into "channels." A user can select a channel (or other unit of content) by interacting with a user interface of the set-top box, which causes the tuner to output the selected content on the device's television interface for display by the television.

Much of the content consumed using a set-top box has advertising that is displayed on the television in connection with the content the user selected for viewing. In the following description, the content that a user has selected for viewing is also referred to here as the "primary content," and the advertising that is displayed in connection with the primary content is also referred to here as "advertising content" or "ad content."

"Ad insertion" refers to the selection of appropriate ad content and the combining of the selected ad content with the primary content selected by a user. Ad insertion for primary content played using a set-top box is typically done by selecting ad content on a geographic basis, with the lowest level of geographic granularity being the neighborhood (identified, for example, by ZIP code). For example, ad content relating to a car dealership located in or near a group of neighborhoods can be inserted into primary content to be played by set-top boxes that are deployed in those neighborhoods. This type of set-top-box ad insertion is not typically done based on the identity of the viewers of the primary content.

SUMMARY

One embodiment is directed to a set-top box comprising an access network interface to communicatively couple the set-top box to an access network. The set-top box further comprises a display device interface to communicatively couple the set-top box to a display device. The set-top box is configured to capture information about a viewer. Advertising content is selected based, at least in part, on the viewer information captured by the set-top box. The set-top box is configured to receive, from the access network coupled to the set-top box, primary content and the selected advertising content. The set-top box is configured to play the primary content on the display device with the selected advertising content inserted therein.

Another embodiment is directed to a method comprising capturing, by a set-top box, information about a viewer using the set-top box to display primary content and playing, using the set-top box, primary content with the advertising content inserted therein that was selected based, at least in part, on the information captured by the set-top box.

Other embodiments are disclosed.

The details of various embodiments are set forth in the accompanying drawings and the description below. Other features and advantages will become apparent from the description, the drawings, and the claims.

DRAWINGS

FIG. 1 is a block diagram illustrating one exemplary embodiment of a system in which a set-top box is used to play content on a television (or other display device) for one or more viewers.

FIG. 2 comprises a high-level flowchart illustrating one exemplary embodiment of a method of using information captured using a set-top box.

FIG. 3 comprises a high-level flowchart illustrating one exemplary embodiment of a method of capturing viewer information using a set-top box.

FIG. 4 comprises a high-level flowchart illustrating one exemplary embodiment of a method of playing primary content with inserted advertising content that was selected based, at least in part, on viewer information captured using a set-top box.

Like reference numbers and designations in the various drawings indicate like elements.

DETAILED DESCRIPTION

Figure 1:
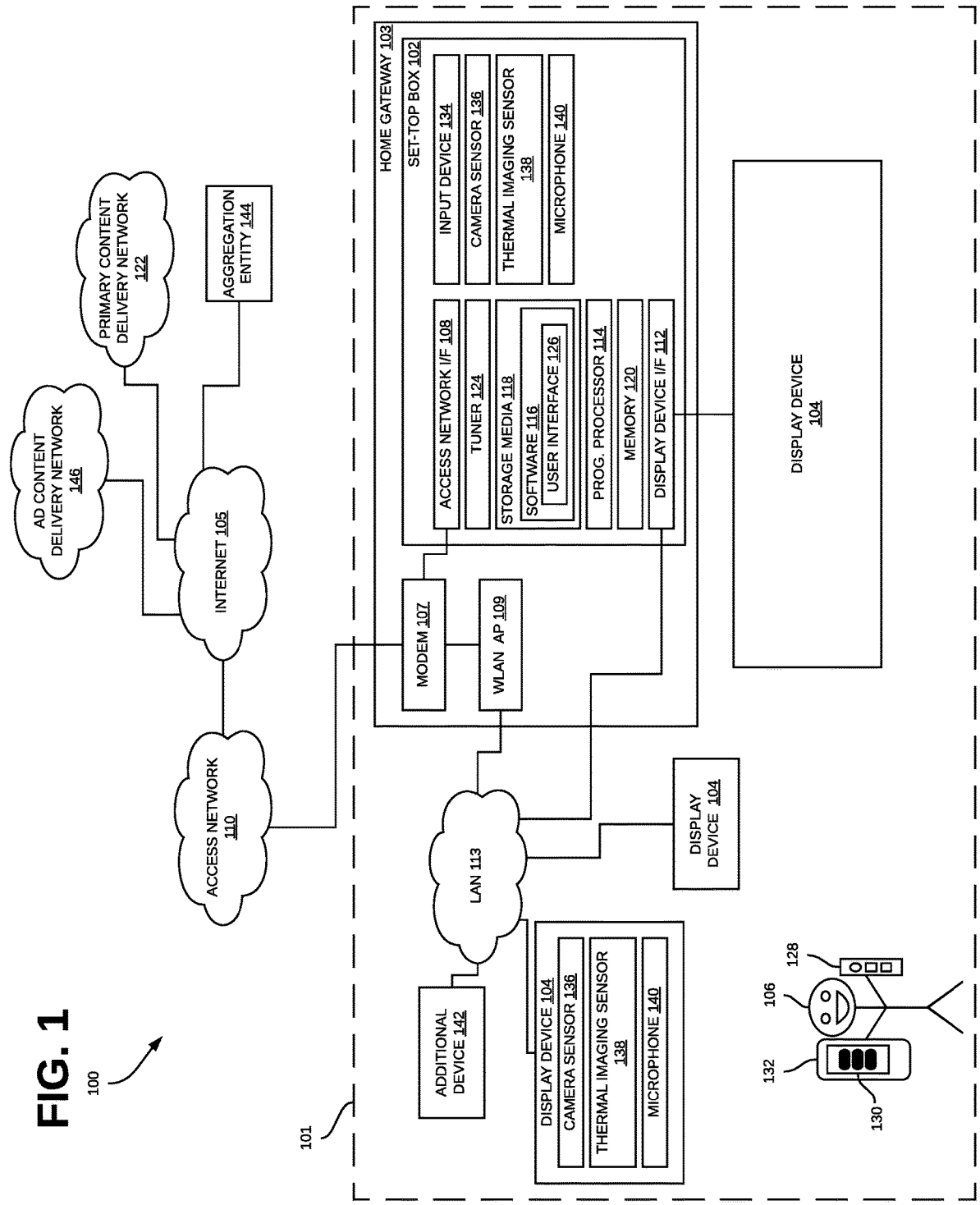

FIG. 1 is a block diagram illustrating one exemplary embodiment of a system 100 in which a set-top box 102 is used to play content on a television (or other display device) 104 for one or more viewers 106. The system 100 shown in FIG. 1 can be used to implement the techniques described here for capturing information using the set-top box 102, where the captured information can be used in connection with inserting advertising content into primary content played for viewers 106 using the set-top box 102.

The set-top box 102 can be used in a residential home (for example, a single-family home or a multiple dwelling unit such as an apartment, townhome, dormitory, hotel, or the like) or other location 101. The set-top box 102 can be used in other locations (for example, in a business or government location).

In the exemplary embodiment shown in FIG. 1, the set-top box 102 is implemented as a part of a home gateway 103 (also referred to as a "home router") that is configured to couple a local area network (LAN) 113 implemented in the home (or other location) 101 to a wide area network (WAN) (such as the Internet 105) via a WAN modem 107. In the particular embodiment shown in FIG. 1, the home gateway 103 also comprises a wireless LAN access point 109, where the LAN 113 in the home (or other location) 101 comprises (at least in part) a wireless LAN implemented by the wireless LAN access point 109. The wireless LAN access point 109 can, for example, implement one or more wireless protocols (such as one or more of the IEEE 802.11 family of protocols). The home gateway 103 can also provide one or more wired Ethernet ports for connecting devices or internetworking equipment to the home gateway 103 (and the associated LAN 113 and WAN). The modem 107 is configured to couple the LAN 113 implemented in the home or other location 101 to the Internet 105 using an access network 110. The access network 110 can comprise one or more of a cable network, a public switched telephone network, a passive optical network, a cellular wireless network, an unlicensed radio frequency spectrum network, an Internet Protocol and/or Ethernet network, and a satellite network.

The set-top box 102 and the home gateway 103 (and the functionality described here as being included therein), as well as the nodes and entities of the system 100 more generally, and any of the specific features described here as being implemented by any of the foregoing, can be implemented in hardware, software, or combinations of hardware and software, and the various implementations (whether hardware, software, or combinations of hardware and software) can also be referred to generally as "circuitry" or a "circuit" configured to implement at least some of the associated functionality. When implemented in software, such software can be implemented in software or firmware executing on one or more suitable programmable processors or by configuring a programmable device (such as a field-programmable gate array (FPGA)). Such hardware or software (or portions thereof) can be implemented in other ways (for example, in an application specific integrated circuit (ASIC), etc.). The set-top box 102 and home gateway 103 (and the functionality described here as being included therein), as well as the nodes and entities of the system 100 more generally, can be implemented in other ways.

Figure 5:
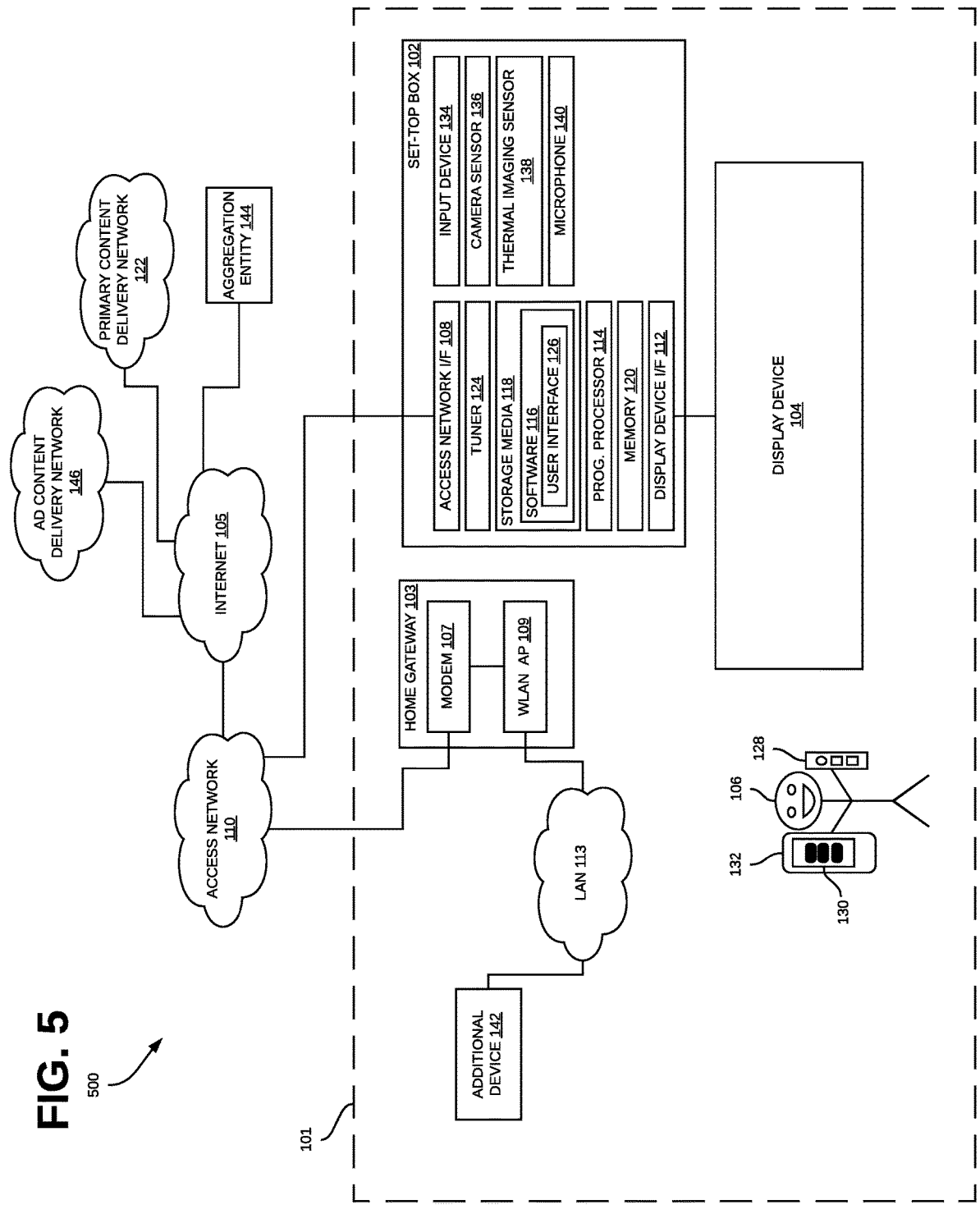
FIG. 5 is a block diagram illustrating another exemplary embodiment of a system in which a set-top box is used to play content on a television (or other display device) for one or more viewers, where the set-top box is implemented as a standalone device that is separate from the home gateway.

The set-top box 102 comprises an access network interface 108 to communicatively couple the set-top box 102 to an access network 110. The access network interface 108 can be configured to communicatively couple the set-top box 102 to a node in the access network 110 directly or indirectly. For example, the access network interface 108 can be configured to communicatively couple the set-top box 102 to a node in the access network 110 indirectly via one or more intermediary active or passive devices such as a network interface device or an antenna unit (for example, where the access network 110 comprises a wireless network). More specifically, in one example, where the set-top box 102 is provided with either primary content or advertising content over the Internet 105 (for example, where the primary content is supplied to the set-top box 102 from an Over-The-Top (OTT) service provider (such as Netflix, Hulu, Amazon Prime Video, or the like)), the access network interface 108 can comprise an Ethernet interface that is coupled to an Ethernet interface of the wireless LAN access point 109 or the modem 107. In another example (for example as shown in FIG. 5), where the set-top box 102 is provided with either primary content or advertising content using a legacy television access network (such as a cable television, HFC, or satellite network), the access network interface 108 can comprise a suitable interface to the legacy television access network.

The set-top box 102 comprises a display device interface 112 to communicatively couple the set-top box 102 to one or more display devices 104. The display device interface 112 can be configured to communicatively couple the set-top box 102 to the display device 104 directly or indirectly (for example, via one or more intermediary active or passive devices) and via one or more wired or wireless connections or networks (such as the LAN 113). For example, the display device interface 112 can be configured to communicatively couple the set-top box 102 to the display device 104 using one or more of the following interfaces: a High-Definition Multimedia Interface (HDMI) interface, a composite video interface, an analog radio frequency (RF) interface, a universal serial bus (USB) interface, a digital visual interface (DVI) interface, and a streaming interface. Examples of display devices 104 include, without limitation, a television or a computer that is directly connected to the set-top box 102 via one or more cables and a television, computer, tablet, smartphone, or other appliance that is coupled to the set-top box 102 via a wired or wireless LAN 113 implemented in the home or location 101 (for example, where content is streamed over the LAN 113 to the relevant device).

In the exemplary embodiment shown in FIG. 1, the set-top box 102 comprises at least one programmable processor 114 configured to execute software or firmware 116 that causes the set-top box 102 to perform at least some of the functions described here as being performed by the set-top box 102. The software or firmware 116 comprises program instructions that are stored (or otherwise embodied) on or in an appropriate non-transitory storage medium or media 118 from which at least a portion of the program instructions are read by the programmable processor 114 for execution thereby. Although the storage media 118 is shown in FIG. 1 as being included in, and local to, the set-top box 102, it is to be understood that remote storage media (for example, storage media that is accessible over a network) and/or removable media can also be used. The set-top box 102 also includes memory 120 for storing the program instructions (and any related data) during execution by the programmable processor 114.

The set-top box 102 is configured to enable a viewer 106 to select content for playing on the display device 104. The content that a viewer 106 has selected for playing on the display device 104 is also referred to here as the "primary content." The primary content can include at least one of video content, audio content, image content, and text content. The primary content is delivered from one more primary content delivery networks 122 to the set-top box 102 via the access network 110. The primary content can include content other than entertainment or news (such as feeds from security cameras).

In the exemplary embodiment shown in FIG. 1, the set-top box 102 comprises a physical or logical (for example, software-implemented) tuner 124 configured to select primary content for playing on a display device 104 coupled to the set-top box 102. How the tuner 124 does this is dictated by the manner in which content is supplied to the set-top box 102 via the access network 110. For example, the tuner 116 can comprise at least one of a cable television tuner (suitable for use where the access network 110 comprises a cable television or HFC network), a satellite television tuner (suitable for use where the access network 110 comprises a satellite network), and a streaming content tuner (suitable for use where content is supplied to the set-top box using streaming technology (for example, using Internet Protocol (IP) streaming). The tuner 124 can be implemented in other ways.

The set-top box 102 is configured to display a user interface 126 for the set-top box 102 on a display device 104 (or possibly another device). The viewer 106 is able to interact with the user interface 126 in order to select primary content for playing on the display device 104. The primary content from which the viewer 106 is able to choose can include content that is packaged as one or more units of content including, for example, one or more channels, shows, movies, streams, sporting or other events, websites, or stations.

The set-top box 102 is configured to receive input for the user interface 126 via at least one of a remote control 128, a mobile application 130 executing on a mobile device 132, and an input device 134 of the set-top box 102. The input device 134 of the set-top box 102 can include, without limitation, a touch screen, a button, a microphone, and an imaging sensor. In one example, the set-top box 102 is configured to interact with a mobile application 130 running on the mobile device 132 (such as a smartphone, tablet, or computer) in connection with implementing the user interface 126 for the set-top box 102. For example, the set-top box 102 and the mobile application 130 can be configured to enable a viewer 106 to use the mobile device 132 (with the mobile application 130 executing thereon) as a remote control for the set-top box 102. Also, at least a part of the user interface 126 can be displayed on the remote control 128 or the mobile device 132 executing the mobile application 130. Also, at least a part of the user interface 126 can be implemented as an audio interface (using a microphone and speaker included in the set-top box 102 or display device 104) or a gesture interface (using a camera or thermal imaging sensor included in the set-top box 102 or display device 104). Moreover, where the viewer 106 is likely to be in the line of site of a camera (optical) sensor included in the set-top box 102 or display device 104, the viewer's gaze can also be used as an input to the user-interface 126 (and can also be tracked for the purposes of capturing information about viewers 106 as described below).

The set-top box 102 is configured to capture information about one or more viewers 106 viewing primary content displayed using a display device 104 coupled to the set-top box 102. In the following description, references to information captured "by" or "using" the set-top box 102 should be understood to also include information captured using a display device 104 coupled to the set-top box 102.

The information captured about one or more viewers 106 can include information about the primary content selected by the viewer 106. Such information can include, for example, information about which primary content was selected by or for the viewer 106 and information about the extent the viewer 106 viewed or otherwise engaged with the selected content (for example, how much of the content was played, how long it took the viewer 106 to play the content, how many times the viewer 106 played the content, whether or not the viewer 106 "liked," shared, rated, recommended, or commented on the content, and the nature of the like, share, rating, recommendation, or comment).

In the exemplary embodiment shown in FIG. 1, the set-top box 102 and/or display device 104 also comprises at least one camera sensor 136. The information about the viewer 106 captured by the set-top box 102 can include information captured using the camera sensor 136 in the set-top box 102 (or the display device 104). The image information captured using the camera sensor 136 can be used to identify individual viewers 106 (or individual attributes of viewers 106) using image processing techniques (for example, by using image processing techniques to recognize facial or other physical attributes of a viewer 106). Moreover, as noted above, where the viewer 106 is likely to be in the line of site of a camera sensor 136 included in the set-top box 102 or display device 104, the viewer's gaze can also be tracked for the purposes of capturing information about viewers 106.

However, there may be privacy concerns with using a camera sensor 136 in a set-top box 102 (or display device 104). Thus, in some embodiments, the set-top box 102 (and/or display device 104) comprises at least one thermal imaging sensor 138, instead of, or in addition to, a camera sensor 136. The information about the viewer 106 captured by the set-top box 102 can include information captured using the thermal imaging sensor 138. The thermal imaging information captured using the thermal imaging sensor 138 can be used to identify individual viewers 106 (or individual attributes of viewers 106) using thermal image processing techniques (for example, by using thermal image processing techniques to recognize facial or other physical attributes of a viewer 106). It may be the case that viewers 106 will have less privacy concerns with using a thermal imaging sensor 138 in a set-top box 102 than with using a camera sensor 136. Moreover, thermal imaging sensors 138 are typically still able to perform thermal imaging even if a viewer 106 is not in the line of sight of the sensor 138 (for example, because at least a portion of the set-top box 102 or display device 104 is obscured by a cabinet, wall, or the like)

In the exemplary embodiment shown in FIG. 1, the set-top box 102 also comprises at least one microphone 140. The information about the viewer 106 captured by the set-top box 102 can include audio information captured using the microphone 140. The audio information captured using the microphone 140 can be used to identify individual viewers 106 (or individual attributes of viewers 106) using voice recognition techniques. Branded audio capture, recognition, and interface technology can be incorporated into the set-top box (for example, AMAZON's ALEXA audio capture, recognition, and interface technology, GOOGLE's GOOGLE ASSISTANT audio capture, recognition, and interface technology, and APPLE's SIRI audio capture, recognition, and interface technology).

In the exemplary embodiment shown in FIG. 1, the set-top box 102 is provided by a service provider that also provides an additional communication service to the residence (or other location) in which the set-top box 102 is installed. In this embodiment, information captured by the service provider in connection with providing the additional communication can be combined with the viewer information captured by the set-top box 102 (and/or the display device 104). For example, as shown in FIG. 1, the service provider also provides Internet service to the home or other location 101 via the home gateway 103 and the information captured by the service provider in connection with providing the additional communication service can include web browsing and/or searching information that captured via the home gateway 103.

However, this is only one example of an additional communication service. The additional communication service can also comprise at least one of: Internet service, landline telephone service, home security monitoring service, Internet-of-Things (IoT) service, and cellular service. For some additional services, one or more additional devices 142 are deployed at the same location as the set-top box 102. Examples of such an additional device 142 include, without limitation, a gateway, modem, IP telephone, router, WiFi access point, cellular femto base station, IoT or home-security gateway, IoT or home-security sensor, and/or IoT or home-security control panel. Examples of information captured by the service provider in connection with providing the additional communication service include, without limitation, an Internet Protocol address that is accessed using the additional communication service, a telephone number that is called, or called from, using the additional communication service, a device that is used with the additional service, and/or a device, service, website, or other resource that is accessed using the additional communication service.

In this embodiment, information captured by the service provider in connection with providing the additional communication can be combined with the viewer information captured by the set-top box 102 (or the display device 104 coupled thereto). A combination of the information captured by the service provider in connection with providing the additional communication service and the viewer information captured by the set-top box 102 can be used in connection with at least one of: selecting advertising content provided via the set-top box 102; selecting advertising content provided via the additional service; identifying the viewer 106; inferring at least one attribute, preference, or segment for the viewer 106; and confirming an inference made based only on the information captured by the service provider in connection with providing the additional communication service or based only on the viewer information captured by the set-top box 102.

In general, information captured using the set-top box 102 (as well as information captured by the service provider in connection with providing an additional communication service to the location where the set-top box 102 is installed) is used by an aggregation entity 144. The aggregation entity 144 can be implemented, for example, as a software entity executing on one or more server computers deployed in the service provider's network, on the set-top box 102, or on the additional device 142 or combinations thereof. The aggregation entity 144 can be implemented in other ways. The aggregation entity 144 aggregates viewer information for all set-top boxes 102 deployed at each location and combines the viewer information with other information (for example, information captured by the service provider in connection with providing one or more additional communication services, information captured by the service provider in connection with customer-service interactions with viewers 106, information provided by other sources of information (such as government agencies, credit bureaus, market or political research companies, and other data aggregators). The aggregation entity 144 can also be configured to use the aggregated information to select advertising content for insertion into primary content displayed via the set-top box 102 and/or for insertion into content or services provided in connection with the additional communication service provided by the service provider. The aggregated information can be communicated to another device (such as the set-top box 102 or one of the additional devices 142) for those devices to locally select advertising content for insertion into the primary content delivered by that device.

In general, the advertising content can be delivered from one or more advertising content delivery networks 146. The actual insertion of the selected advertising content into the primary content can occur locally at the set-top box 102 or remotely at another entity (for example, at a node in the service provider's network).

Advertising content can include, without limitation, in-stream ads that are played instead of the primary content (for example, where the ad is played either before, after, or while the primary content is played), in-banner ads that are played at the same the primary content is played (for example, where the ad comprises an image or text that is overlaid with the primary content), and paid-for search results (for example, where the ad comprises a paid-for search result that is displayed in a list of search results along with other "organic" search results, where the search can be web browser search and/or a search for primary content that is performed using the user interface 126 of the set-top box 102).

Information captured using the set-top box 102 (as well as information captured by the service provider in connection with providing an additional communication service to the location where the set-top box 102 is installed) can be used in various ways. In particular, information captured using the set-top box 102 (as well as information captured by the service provider in connection with providing an additional communication service to the location where the set-top box 102 is installed) can be used for selecting advertising content for insertion into primary content played using a set-top box 102. One example is shown in FIG. 2.

Figure 2:
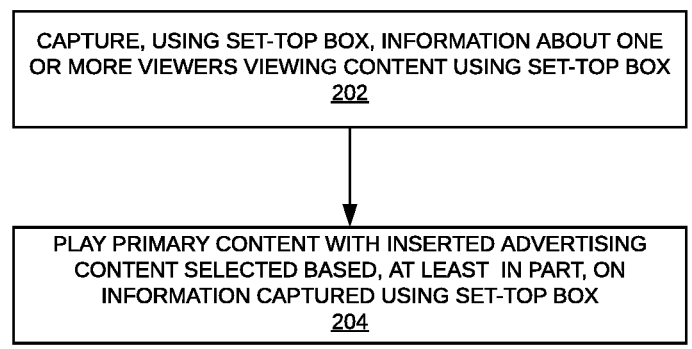

FIG. 2 comprises a high-level flowchart illustrating one exemplary embodiment of a method 200 of using information captured using a set-top box. The embodiment of method 200 shown in FIG. 2 is described here as being implemented using the system 100 described above in connection with FIG. 1, though it is to be understood that other embodiments can be implemented in other ways.

The blocks of the flow diagram shown in FIG. 2 have been arranged in a generally sequential manner for ease of explanation; however, it is to be understood that this arrangement is merely exemplary, and it should be recognized that the processing associated with method 200 (and the blocks shown in FIG. 2) can occur in a different order (for example, where at least some of the processing associated with the blocks is performed in parallel and/or in an event-driven manner). Also, most standard exception handling is not described for ease of explanation; however, it is to be understood that method 200 can and typically would include such exception handling.

Method 200 comprises capturing, using a set-top box 102, information about one or more viewers 106 that are viewing content using the set-top box 102 (block 202). One example of how this can be done is described below in connection with FIG. 3. Other examples can be implemented in other ways.

Method 200 further comprises playing primary content with inserted advertising content that was selected based, at least in part, on information captured using a set-top box 102 (block 204). One example of how this can be done is described below in connection with FIG. 4. Other examples can be implemented in other ways.

It should be noted that information captured using the set-top box 102 during a first viewing session can be used to select advertising for insertion in primary content played during that first viewing sessions and/or for insertion in primary content played during one or more subsequent viewing sessions.

Figure 3:
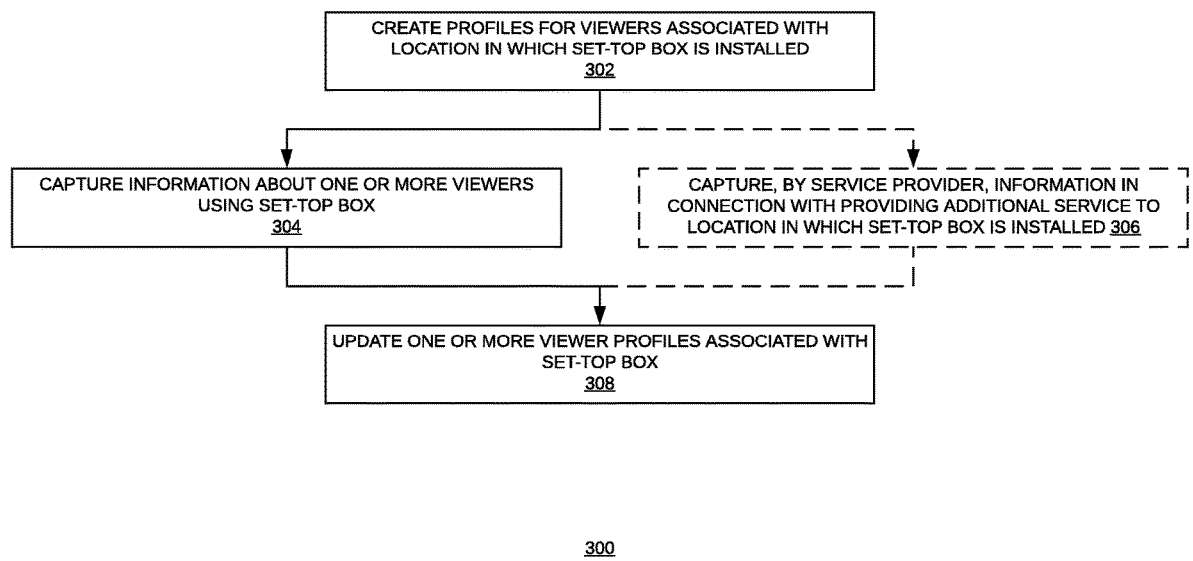

FIG. 3 comprises a high-level flowchart illustrating one exemplary embodiment of a method 300 of capturing viewer information using a set-top box. The embodiment of method 300 shown in FIG. 3 is described here as being implemented using the system 100 described above in connection with FIG. 1, though it is to be understood that other embodiments can be implemented in other ways.

The blocks of the flow diagram shown in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel and/or in an event-driven manner). Also, most standard exception handling is not described for ease of explanation; however, it is to be understood that method 300 can and typically would include such exception handling.

The processing associated block 302 is typically performed once (for example, when the set-top box 102 is first installed in the home or other location 101), whereas the processing associated with the remaining blocks 302-308 is typically performed repeatedly (for example, each time new information is captured).

Method 300 comprises creating one or more profiles for viewers 106 associated with the location 101 in which the set-top box 102 is installed (block 302).

The identities of the various people residing at the location where the set-top box 102 is installed can be captured at the time set-top box 102 (or the associated service provided by the set-top box 102) is ordered by a person residing at the location. Typically, the service provider will capture, for billing purposes, detailed identity information about at least one person residing at the location where the set-top box 102 is to be deployed. During the initial customer service interaction in which this billing information is captured, the service provider can attempt to obtain identity information about all of the other individuals residing at that location who are likely to view content provided via the set-top box 102. If information about only a single person residing at that location is captured during the initial customer service interaction, data obtained from other information sources (such as government agencies, credit bureaus, market or political research companies, and other data aggregators) can be used in order to determine identity information about all the other individuals residing at that location based on one or more relationships (for example, a family relationship) with the single person for which the service provider was able to obtain identity information during the initial customer service interaction. During each subsequent customer service interaction involving a person residing at the location, the service provider can ask the person to verify and update the identity information of the various people residing at the location who are likely to view content provided via the set-top box 102. Other conventional customer information acquisition techniques can be used (including, for example, email and telephone promotions that involve the recipient providing identity information of one or more people who are likely to view content provided via the set-top box 102).

The identity information about the people who are likely to view content provided by any set-top box 102 at a given location can be used to create a separate profile for each such person. Also, profiles for the location as a whole and for other groupings of such people (groups such as kids, adults, women, men, etc.) can be created as well. In this example, these profiles are created and maintained by the aggregation entity 144.

The profiles created for each person who is likely to view content using the set-top box 102 can include information about one or more facial or other physical attributes of the person. This information can be captured, for example, during the initial installation or set-up of the set-top box 102. For example, the set-top box 102 can be configured to individually display, in the user interface 126, the name of each person likely to view content using the set-top box 102 and request that person to position himself or herself within the field of view of one or more of the camera sensors 136 and thermal imaging sensor 138 so that camera and/or thermal image information can be captured and stored in that person's profile. Also, the set-top box 102 can be configured to individually display, in the user interface 126, the name of each person likely to view content using the set-top box 102 and request that person to position himself or herself near the microphone 140 and speak some predefined words so that audio information can be captured by the microphone 140 and stored in that person's profile.

Method 300 further comprises capturing information about one or more viewers 106 using a set-top box 102 (block 304) and, optionally, capturing, by the service provider, information in connection with providing an additional communication service to the location where the set-top box 102 is installed (block 306). In this example, the viewer information that is captured using the set-top box 102, and information captured by the service provider in connection with providing an additional communication service to the location where the set-top box 102 is installed, are provided to the aggregation entity 144.

Method 300 further comprises updating one or more viewer profiles associated with the set-top box 102 with the information captured using the set-top box 102 and with information captured by the service provider in connection with providing an additional communication service to the location where the set-top box 102 is installed (block 308). For example, periodically during a viewing session that involves the set-top box 102, one or more of the camera sensor 136, thermal imaging sensor 138, and microphone 140 can be used to capture camera imaging information, thermal imaging information, and/or audio information. Then, facial or other physical attribute recognition techniques and/or voice recognition techniques can be used to determine if any of the captured image and/or audio information matches the image and/or audio information stored in any of the viewer profiles maintained by the aggregation entity 144. Any matching viewer profiles are then updated with all of the information captured using the set-top box 102 and information captured by the service provider in connection with providing an additional communication service to the location where the set-top box 102 is installed. Updating each matching viewer profile can include storing the new information in the viewer profile. Also, updating each matching viewer profile can include processing all of the information stored in the viewer profile to infer one or more attributes or preferences of the person associated with that profile and/or to infer one or more customer segments for that person. Conventional statistical and/or machine learning techniques can be used to do this. A correlation coefficient, weight, score, or similar value can be determined for each such inferred attribute, preference, or segment that indicates how strong or accurate the inference for that attribute, preference, or segment is. In this example, the inferred attributes, preferences, and segments (along with the associated correlation coefficients, weights, scores, or similar values) are also stored in the associated profile. The update viewer profiles can be used, for example, advertising content insertion for primary content played using the set-top box 102 (for example, as described below in connection with FIG. 4) and for other purposes (for example, for advertising content insertion for content delivered in connection with the service provider providing the additional communication service). The update profiles can be used in other ways. For example, the updated profiles (and more generally the information captured by the set-top box 102) can be used in suggesting primary (and/or advertising) content to be viewed by the associated viewer 106. The updated profiles (and more generally the information captured by the set-top box 102) can be used (for example, by the service provider, the primary content providers, and/or the advertising content providers) in other ways.

Examples of the attributes, preferences, and segments include, without limitation, an identity of the viewer, an age of the viewer, a sex of the viewer, a race of the viewer, a nationality of the viewer, a native language of the viewer, an occupation of the viewer, a hobby of the viewer, a disease of the viewer, a marital status of the viewer, a health condition of the viewer, a financial condition of the viewer, a consumer preference of the viewer, a dietary preference of the viewer, a political preference of the viewer, a religious preference of the viewer, a primary content preference of the viewer, and an advertising preference of the viewer.

Moreover, in some embodiments, capturing information about one or more viewers 106 using a set-top box 102 also comprises prompting (and receiving from) one or more of the viewers 106 to provide additional information that can be used to explicitly or more effectively identify one or more of the viewers 106 and/or to confirm a determination made based on the other captured information. This can be done, for example, via the user interface 126 of the set-top box 102, via a mobile application 130 executing on the mobile device 132, via the remote control 126, and/or in connection with an additional service provided by the service to the location where the set-top box is installed. Also, optionally, this additional information can be requested in connection with an offer to provide the viewers 106 access to additional or premium content (for example, for free or at a reduced rate) and/or to an additional or improved service provided via the set-top box 102 or by provided by the service provider in connection with another service provided by that or a different service provider.

Figure 4:
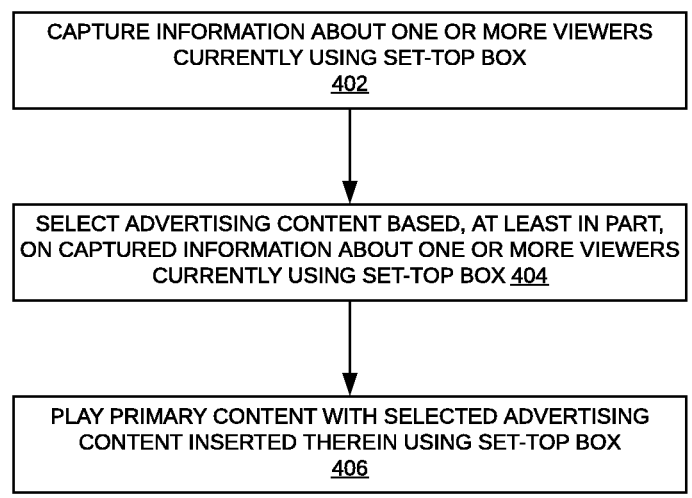

FIG. 4 comprises a high-level flowchart illustrating one exemplary embodiment of a method 400 of playing primary content with inserted advertising content that was selected based, at least in part, on viewer information captured using a set-top box 102. The embodiment of method 400 shown in FIG. 4 is described here as being implemented using the system 100 described above in connection with FIG. 1, though it is to be understood that other embodiments can be implemented in other ways.

The blocks of the flow diagram shown in FIG. 4 have been arranged in a generally sequential manner for ease of explanation; however, it is to be understood that this arrangement is merely exemplary, and it should be recognized that the processing associated with method 400 (and the blocks shown in FIG. 4) can occur in a different order (for example, where at least some of the processing associated with the blocks is performed in parallel and/or in an event-driven manner). Also, most standard exception handling is not described for ease of explanation; however, it is to be understood that method 400 can and typically would include such exception handling.

The processing associated with method 400 can be performed each time advertising content needs to be selected for insertion into primary content that is to be played using a set-top box 102. This can be done at the beginning of a viewing session (for example, where all (or some) advertising content to be played during the viewing sessions is selected before the set-top box 102 starts playing the primary content), during the viewing session (for example, where at least some of the advertising content to be played during the viewing sessions is selected after the set-top box 102 starts playing the primary content but before the end of the primary content has finished playing), and/or at or after the end of the viewing session (for example, where some advertising content (such as post-roll advertising content) is selected at the end of the viewing session). The processing associated with method 400 can be performed at other times and in other ways.

Method 400 comprises capturing information about one or more viewers 106 currently using the set-top box 102 to view primary content (block 402). In this example, the information about the one or more viewers 106 that are currently using the set-top box 102 is captured and is provided to the aggregation identification entity 144. For example, in connection with a given viewing session that involves the set-top box 102, one or more of the camera sensor 136, thermal imaging sensor 138, and microphone 140 can be used to capture camera imaging information, thermal imaging information, and/or audio information.

Moreover, in some embodiments, capturing information about one or more viewers 106 currently using the set-top box 102 to view primary content also comprises prompting (and receiving from) one or more of the viewers 106 to provide additional information that can be used to explicitly or more effectively identify one or more of the viewers 106 and/or to confirm a determination made based on the other captured information. This can be done, for example, via the user interface 126 of the set-top box 102, via a mobile application 130 executing on the mobile device 132, via the remote control 126, and/or in connection with an additional service provided by the service to the location where the set-top box is installed. Also, optionally, this additional information can be requested in connection with an offer to provide the viewers 106 access to additional or premium content (for example, for free or at a reduced rate) and/or to an additional or improved service provided via the set-top box 102 or by provided by the service provider in connection with another service provided by that or a different service provider.

Method 400 further comprises selecting advertising content based, at least in part, on the captured information about one or more viewers 106 currently using the set-top box 102 (block 404). In this example, the aggregation entity 144 can use facial or other physical attribute recognition techniques and/or voice recognition techniques to determine if any of the captured image and/or audio information matches the image and/or audio information stored in any of the viewer profiles maintained by the aggregation entity 144.

Then, for each matching viewer profile, the aggregation entity 144 uses one or more of the inferred attributes, preferences, or segments (along with the associated correlation coefficients, weights, scores, or similar values) that are stored in each such viewer profile in order to select advertising content for the person associated with the viewer profile.

In this example, each item of advertising content has an associated profile (also referred to here as an "ad profile") that includes criteria that indicates if a given viewer profile is a match for the associated advertising content. These criteria (also referred to here as "match criteria") can be a function of one or more desired attributes, preferences, or segments that the associated advertiser would like any viewer of the associated advertising content to have. The matching criteria can also be a function of a desired correlation coefficient, weight, score, or similar value for each desired attribute, preference, or segment.

The aggregation entity 144 can search for ad profiles that match each identified viewer profile by applying the matching criteria stored in each ad profile to the inferred attributes, preferences, and/or segments (and/or the associated correlation coefficients, weights, scores, or similar values) in each viewer profile. All matching ad profiles can be ranked (for example, based on the amount the advertising is willing to pay for playing the associated advertising content, based on the strength of the match, etc.). Then, the aggregation entity 144 can select the advertising content associated with the highest ranked ad profiles.

Advertising content can be selected in other ways.

Method 400 further comprises playing primary content with the selected advertising content inserted therein using the set-top box 102 (block 406). As noted above, the insertion of the advertising content into the primary content can be done at various locations. For example, the selected advertising content and the primary content can be separately delivered to the set-top box 102 and the set-top box 102 itself can be configured to the insert the selected advertising content in the primary content. The selected advertising content can be inserted into the primary content elsewhere and the primary content with the selected advertising content inserted therein can be delivered to the set-top box 102. For example, the selected advertising content can be inserted into the primary content at the primary content delivery network 122, at the advertising content delivery network 146, at the aggregation entity 144, and/or at some other node in the service provider's network or other network.

In some embodiments, by using at least some of the techniques described above, advertising content can be inserted into primary content that is consumed using a set-top box 102 based on information captured using the set-top box 102. This captured information can include information that is captured during the current viewing session, which can be used to identify the particular viewers that will be consuming the primary content. Advertising content that is targeted to those particular viewers (as opposed to more general advertising content that is selected based on cruder geographic targeting) can be selected and inserted into the primary content. Also, information captured by the set-top box 102, across many viewing sessions, can be used to create and update viewer profiles, which can be used in selecting advertising content for the associated viewers, for selecting advertising content to be inserted into content delivered in connection with the service provider providing an additional communication service to the location where the set-top box 102 is installed. Moreover, a service provider can capture information in connection with providing an additional communication service to the location where the set-top box 102 is installed. This additional information can be used in creating and updating the viewer profiles and can be used in identifying additional attributes, preferences, or segments for the associated viewer. All of this can result in opportunities to deliver more targeted advertising to viewers, for which advertisers may be willing to pay a premium.

In the exemplary embodiment shown in FIG. 1, the set-top box 102 is implemented as a part of a home gateway 103. However, it is to be understood that the set-box 102 can be implemented in other ways. For example, as shown in FIG. 5, the set-top box 102 can be implemented as a standalone device that is separate from the home gateway 103. In the example shown in FIG. 5, the standalone set-top box 102 is provided with either primary content or advertising content using a legacy television access network 110 (such as a cable television, HFC, or satellite network), and the access network interface 108 is coupled to the legacy television access network 110 using a suitable interface. Each set-top box 102 can be implemented in other ways.

Figure 6:
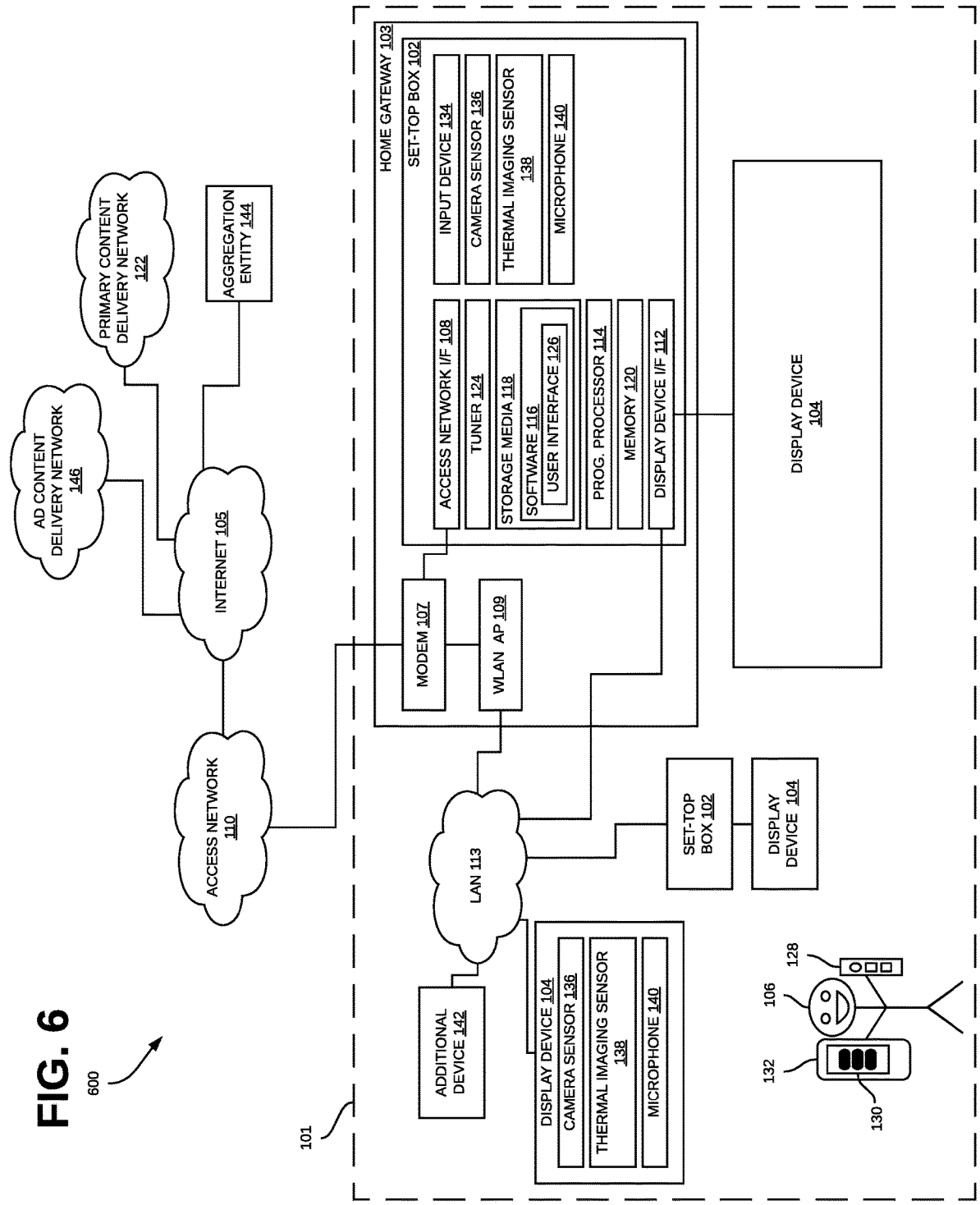
FIG. 6 is a block diagram illustrating one exemplary embodiment of a system in which multiple set-top boxes are used to play content on a television (or other display device) for one or more viewers.

In the exemplary embodiments shown in FIGS. 1 and 5, only one set-top box 102 is depicted. However, as shown in FIG. 6, multiple set-top boxes 102 can be installed in the home or other location 101 and information can be captured using all of the set-top boxes 102 and can be aggregated and used as described above.

Also, at least some of the captured information can be reported back to the content providers and/or advertisers. For example, the reported-back information can include how many people were engaged with the content or ad as well as how engaged they were based on things like gaze, movement, and consumption on other devices (for example, if they were using their phone at the same time as they were consuming the content or ad).

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

Example Embodiments

Example 1 includes a set-top box comprising: an access network interface to communicatively couple the set-top box to an access network; and a display device interface to communicatively couple the set-top box to a display device; wherein the set-top box is configured to capture information about a viewer; wherein advertising content is selected based, at least in part, on the viewer information captured by the set-top box; wherein the set-top box is configured to receive, from the access network coupled to the set-top box, primary content and the selected advertising content; and wherein the set-top box is configured to play the primary content on the display device with the selected advertising content inserted therein.

Example 2 includes the set-top box of Example 1, wherein the set-top box is at least one of: implemented as a part of a home gateway and implemented as a standalone device.

Example 3 includes the set-top box of any of Examples 1-2, wherein multiple display devices are coupled to the set-top box.

Example 4 includes the set-top box of any of Examples 1-3, wherein at least one display device is coupled to the set-top box via a local area network.

Example 5 includes the set-top box of any of Examples 1-4, wherein the access network communicatively coupled to the set-top box comprises at least one of: a cable network, a public switched telephone network, a passive optical network, a cellular wireless network, an unlicensed radio frequency spectrum network, an Internet Protocol network, an Internet network, and satellite network.

Example 6 includes the set-top box of any of Examples 1-5, further comprising a tuner configured to select primary content for playing on the display device.

Example 7 includes the set-top box of Example 6, wherein the tuner comprises at least one of a cable television tuner, a satellite television tuner, and a streaming content tuner.

Example 8 includes the set-top box of any of Examples 1-7, wherein the display comprises at least one of a television and a computer monitor.

Example 9 includes the set-top box of any of Examples 1-8, wherein the primary content comprises at least one of video content, audio content, image content, and text content.

Example 10 includes the set-top box of any of Examples 1-9, wherein the advertising content comprises at least one of video content, audio content, image content, and text content.

Example 11 includes the set-top box of any of Examples 1-10, wherein the set-top box is configured to display a user interface for the set-top box on the display device.

Example 12 includes the set-top box of any of Examples 1-11, wherein the set-top box is configured to receive input for a user interface of the set-top box via at least one of a remote control, a mobile application executing on a mobile device, and input device of the set-top box.

Example 13 includes the set-top box of any of Examples 1-12, wherein the set-top box is configured to interact with a mobile application running on a mobile device in order to provide a user interface for the set-top box.

Example 14 includes the set-top box of any of Examples 1-13, wherein the set-top box is configured to capture differentiated information about individual ones of a plurality of viewers of the display device; and wherein the advertising content is selected based, at least in part, on the captured differentiated information about individual ones of a plurality of viewers of the display device.

Example 15 includes the set-top box of any of Examples 1-14, wherein the set-top box is configured to communicate the information captured by the set-top box to an aggregation entity, wherein the information captured by the set-top box is used to update a profile for the viewer.

Example 16 includes the set-top box of Example 15, wherein the profile for the viewer is used for selecting the advertising content.

Example 17 includes the set-top box of any of Examples 1-16, wherein the information captured by the set-top box is used in suggesting primary content to be viewed by the viewer.

Example 18 includes the set-top box of any of Examples 1-17, wherein advertising content is selected by at least one of: the set-top box and an entity deployed outside of the set-top box; and wherein the selected advertising content is inserted into the selected primary content at least one of: at the set-top box and at an entity deployed outside of the set-top box.

Example 19 includes the set-top box of any of Examples 1-18, further comprising at least one camera sensor; wherein the information captured by the set-top box comprises camera imaging information captured using the camera imaging sensor.

Example 20 includes the set-top box of Example 19, wherein the camera imaging information captured using the camera imaging sensor is used to identify individual viewers using camera physical attribute recognition.

Example 21 includes the set-top box of any of Examples 1-20, further comprising at least one thermal imaging sensor; wherein the information captured by the set-top box comprises thermal imaging information captured using the thermal imaging sensor.

Example 22 includes the set-top box of Example 21, wherein the thermal imaging information captured using the thermal imaging sensor is used to identify individual viewers using thermal physical attribute recognition.

Example 23 includes the set-top box of any of Examples 1-22, further comprising at least one microphone; wherein the information captured by the set-top box comprises audio information captured using the microphone.

Example 24 includes the set-top box of Example 23, wherein the audio information captured using the microphone is used to identify individual viewers using voice recognition.

Example 25 includes the set-top box of any of Examples 1-24, wherein an attribute, preference, or segment of the viewer is inferred based, at least in part, on the information captured by the set-top box.

Example 26 includes the set-top box of Example 25, wherein the attribute, preference, or segment of the viewer is used, at least in part, in selecting the advertising content.

Example 27 includes the set-top box of any of Examples 25-26, wherein the attribute, preference, or segment of the viewer comprises at least one of: an identity of the viewer, an age of the viewer, a sex of the viewer, a race of the viewer, a nationality of the viewer, a native language of the viewer, an occupation of the viewer, a hobby of the viewer, a disease of the viewer, a marital status of the viewer, a health condition of the viewer, a financial condition of the viewer, a consumer preference of the viewer, a dietary preference of the viewer, a political preference of the viewer, a religious preference of the viewer, a primary content preference of the viewer, and an advertising preference of the viewer.

Example 28 includes the set-top box of any of Examples 1-27, wherein an inference made based, at least in part, on the information captured by the set-top box is confirmed using additional information.

Example 29 includes the set-top box of any of Examples 1-28, wherein an inference made based, at least in part, on the information captured by the set-top box is confirmed using at least one of: the set-top box; a remote control associated with the set-top box; and a mobile application associated with the set-top box, the mobile application running on a mobile device.

Example 30 includes the set-top box of any of Examples 1-29, wherein the set-top box is configured to offer the viewer at least one of the following in exchange for providing additional information about the viewer: promotional primary content and a promotional service upgrade.

Example 31 includes the set-top box of Example 30, wherein the additional information provided by the viewer is used to confirm an inference made based, at least in part, on the information captured by the set-top box.

Example 32 includes the set-top box of any of Examples 1-31, wherein the set-top box is configured to capture information about the viewer that is not based on the viewer logging into an account.

Example 33 includes the set-top box of any of Examples 1-32, wherein the information captured by the set-top box comprises at least one of: identification information indicative of an identity of the viewer; engagement information indicative of engagement of the viewer with at least one of the advertising content and the primary content; and viewing information indicative of viewing by the viewer of at least one of the advertising content and the primary content.

Example 34 includes the set-top box of any of Examples 1-33, wherein the set-top box is provided by a service provider that provides an additional communication service to a home in which the set-top box is installed; wherein information captured by the service provider in connection with providing the additional communication is combined with the information captured by the set-top box; and wherein a combination of the information captured by the service provider in connection with providing the additional communication service and the information captured by the set-top box is used in connection with at least one of: selecting advertising content provided via the set-top box; selecting advertising content provided via the additional service; identifying the viewer; inferring at least one attribute of the viewer; and confirming an inference made based on only one of the information captured by the service provider in connection with providing the additional communication service and the information captured by the set-top box.

Example 35 includes the set-top box of Example 34, wherein the additional services comprise at least one of: Internet service, landline telephone service, home security monitoring service, Internet-of-Things (IoT) service, and cellular service.

Example 36 includes the set-top box of Examples 34-35, wherein the information captured by the service provider in connection with providing the additional communication comprises at least one of: an Internet Protocol address that is accessed using the additional communication service, a telephone number that is called, or called from, using the additional communication service, and a service that is accessed using the additional communication service.

Example 37 includes method comprising: capturing, by a set-top box, information about a viewer using the set-top box to display primary content; and playing, using the set-top box, primary content with the advertising content inserted therein that was selected based, at least in part, on the information captured by the set-top box.

Example 38 includes the method of Example 37, wherein the set-top box is at least one of: implemented as a part of a home gateway and implemented as a standalone device.

Example 39 includes the method of any of Examples 37-38, wherein multiple display devices are coupled to the set-top box.

Example 40 includes the method of any of Examples 37-39, wherein at least one display device is coupled to the set-top box via a local area network.

Example 41 includes the method of any of Examples 37-40, wherein capturing, by the set-top box, the information about the viewer using the set-top box to display primary content comprises capturing differentiated information about individual ones of a plurality of viewers using the set-top box; wherein the advertising content is selected based, at least in part, on the captured differentiated information about individual ones of a plurality of viewers of the display device.

Example 42 includes the method of any of Examples 37, the information captured by the set-top box is communicated to an aggregation entity, wherein the information captured by the set-top box is used to update a profile for the viewer.

Example 43 includes the method of Example 42, wherein the profile for the viewer is used for selecting the advertising content.

Example 44 includes the method of any of Examples 37-43, wherein the information captured by the set-top box is used in suggesting primary content to be viewed by the viewer.

Example 45 includes the method of any of Examples 37-44, wherein advertising content is selected by at least one of: the set-top box and an entity deployed outside of the set-top box; and wherein the selected advertising content is inserted into the selected primary content at least one of: at the set-top box and at an entity deployed outside of the set-top box.

Example 46 includes the method of any of Examples 37-45, further comprising at least one camera sensor; wherein the information captured by the set-top box comprises camera imaging information captured using the camera imaging sensor.

Example 47 includes the method of Example 46, wherein the camera imaging information captured using the camera imaging sensor is used to identify individual viewers using camera physical attribute recognition.

Example 48 includes the method of any of Examples 37-47, wherein the information is captured by the set-top box comprises thermal imaging information captured using a thermal imaging sensor in the set-top box.

Example 49 includes the method of any of Examples 46-48, wherein the thermal imaging information captured using the thermal imaging sensor is used to identify individual viewers using thermal physical attribute recognition.

Example 50 includes the method of any of Examples 37-49, wherein the information captured by the set-top box comprises audio information captured using a microphone in the set-top box.

Example 51 includes the method of Example 50, wherein the audio information captured using the microphone is used to identify individual viewers using voice recognition.

Example 52 includes the method of any of Examples 37-51, wherein an attribute, preference, or segment of the viewer is inferred based, at least in part, on the information captured by the set-top box.

Example 53 includes the method of Example 52, wherein the attribute, preference, or segment of the viewer is used, at least in part, in selecting the advertising content.

Example 54 includes the method of any of Examples 52-53, wherein the attribute, preference, or segment of the viewer comprises at least one of: an identity of the viewer, an age of the viewer, a sex of the viewer, a race of the viewer, a nationality of the viewer, a native language of the viewer, an occupation of the viewer, a hobby of the viewer, a disease of the viewer, a marital status of the viewer, a health condition of the viewer, a financial condition of the viewer, a consumer preference of the viewer, a dietary preference of the viewer, a political preference of the viewer, a religious preference of the viewer, a primary content preference of the viewer, and an advertising preference of the viewer.

Example 55 includes the method of any of Examples 37-54, wherein an inference made based, at least in part, on the information captured by the set-top box is confirmed using additional information.

Example 56 includes the method of any of Examples 37-55, wherein an inference made based, at least in part, on the information captured by the set-top box is confirmed using at least one of: the set-top box; a remote control associated with the set-top box; and a mobile application associated with the set-top box, the mobile application running on a mobile device.

Example 57 includes the method of any of Examples 37-56, further comprising offering the viewer at least one of the following in exchange for providing additional information about the viewer: promotional primary content and a promotional service upgrade.

Example 58 includes the method of Example 57, wherein the additional information provided by the viewer is used to confirm an inference made based, at least in part, on the information captured by the set-top box.

Example 59 includes the method of any of Examples 37-58, wherein the set-top box is configured to capture information about the viewer that is not based on the viewer logging into an account.

Example 60 includes the method of any of Examples 37-59, wherein the information captured by the set-top box comprises at least one of: identification information indicative of an identity of the viewer; engagement information indicative of engagement of the viewer with at least one of the advertising content and the primary content; and viewing information indicative of viewing by the viewer of at least one of the advertising content and the primary content.

Example 61 includes the method of any of Examples 37-60, wherein the set-top box is provided by a service provider that provides an additional communication service to a home in which the set-top box is installed; wherein information captured by the service provider in connection with providing the additional communication is combined with the information captured by the set-top box; wherein a combination of the information captured by the service provider in connection with providing the additional communication service and the information captured by the set-top box is used in connection with at least one of: selecting advertising content provided via the set-top box; selecting advertising content provided via the additional service; identifying the viewer; inferring at least one attribute of the viewer; and confirming an inference made based on only one of the information captured by the service provider in connection with providing the additional communication service and the information captured by the set-top box.

Example 62 includes the method of Example 61, wherein the additional services comprise at least one of: Internet service, landline telephone service, home security monitoring service, Internet-of-Things (IoT) service, and cellular service.

Example 63 includes the method of any of Examples 61-62, wherein the information captured by the service provider in connection with providing the additional communication comprises at least one of: an Internet Protocol address that is accessed using the additional communication service, a telephone number that is called using the additional communication service, and a service that is accessed using the additional communication service.

What is claimed is:

1. A set-top box comprising:
an access network interface to communicatively couple the set-top box to an access network; and
a display device interface to communicatively couple the set-top box to a display device;
wherein the set-top box is configured to capture information about a viewer;
wherein the set-top box is configured to generate a viewer profile for the viewer based on the captured information;
wherein the set-top box is configured to infer an attribute, preference, or segment of the viewer based on the captured information stored in the viewer profile, the attribute, preference, or segment of the viewer includes at least one of: a sex of the viewer, a race of the viewer, a nationality of the viewer, a native language of the viewer, an occupation of the viewer, a hobby of the viewer, a disease of the viewer, a marital status of the viewer, a health condition of the viewer, a financial condition of the viewer, a consumer preference of the viewer, a dietary preference of the viewer, a political preference of the viewer, a religious preference of the viewer, a primary content preference of the viewer, and an advertising preference of the viewer;
wherein the set-top box is configured to determine the accuracy of the attribute, preference, or segment of the viewer by comparing the inferred attribute, preference or segment to a customer profile;
wherein the set-top-box configured to generate a correlation coefficient for each inferred attribute, preference, or segment, the correlation coefficient based on the accuracy of the inferred attribute, preference or segment to a viewer profile;
wherein the set-top box is configured to update the viewer profile for the viewer with the determined correlation coefficients for each of the inferred attribute, preference, or segment;
wherein the set-top-box is configured to select advertising content based on one or more ad profiles, each of the one or more ad profiles including match criteria, the match criteria indicating a desired attribute, preference, segment, or correlation coefficient, the selecting of advertising content includes:
the set-top box configured to determine the match criteria of at least one of the one or more ad profiles matches one or more of the inferred attribute, preference, segment, or generated correlation coefficient of the viewer profile;
wherein the set-top box is configured to receive, from the access network coupled to the set-top box, primary content and the selected advertising content; and
wherein the set-top box is configured to play the primary content on the display device with the selected advertising content inserted therein.

2. The set-top box of claim 1, wherein the set-top box is at least one of: implemented as a part of a home gateway and implemented as a standalone device.

3. The set-top box of claim 1, wherein multiple display devices are coupled to the set-top box.

4. The set-top box of claim 1, wherein at least one display device is coupled to the set-top box via a local area network.

5. The set-top box of claim 1, wherein the access network communicatively coupled to the set-top box comprises at least one of: a cable network, a public switched telephone network, a passive optical network, a cellular wireless network, an unlicensed radio frequency spectrum network, an Internet Protocol network, an Internet network, and satellite network.

6. The set-top box of claim 1, further comprising a tuner configured to select primary content for playing on the display device.

7. The set-top box of claim 6, wherein the tuner comprises at least one of a cable television tuner, a satellite television tuner, and a streaming content tuner.

8. The set-top box of claim 1, wherein the display comprises at least one of a television and a computer monitor.

9. The set-top box of claim 1, wherein the primary content comprises at least one of video content, audio content, image content, and text content.

10. The set-top box of claim 1, wherein the advertising content comprises at least one of video content, audio content, image content, and text content.

11. The set-top box of claim 1, wherein the set-top box is configured to display a user interface for the set-top box on the display device.

12. The set-top box of claim 1, wherein the set-top box is configured to receive input for a user interface of the set-top box via at least one of a remote control, a mobile application executing on a mobile device, and input device of the set-top box.

13. The set-top box of claim 1, wherein the set-top box is configured to interact with a mobile application running on a mobile device in order to provide a user interface for the set-top box.

14. The set-top box of claim 1, wherein the set-top box is configured to capture differentiated information about individual ones of a plurality of viewers of the display device; and
wherein the advertising content is selected based, at least in part, on the captured differentiated information about individual ones of a plurality of viewers of the display device.

15. The set-top box of claim 1, wherein the set-top box is configured to communicate the information captured by the set-top box to an aggregation entity, the aggregation entity receiving information from a plurality of other service provider set-top boxes of one or more other service provider users to generate one or more user group profiles, wherein the one or more of the user group profiles is used to update the viewer profile.

16. The set-top box of claim 15, wherein the updated viewer profile is used for selecting the advertising content.

17. The set-top box of claim 1, wherein the information captured by the set-top box is used in suggesting primary content to be viewed by the viewer.

18. The set-top box of claim 1, wherein advertising content is selected by at least one of: the set-top box and an entity deployed outside of the set-top box; and
wherein the selected advertising content is inserted into the selected primary content at least one of: at the set-top box and at an entity deployed outside of the set-top box.

19. The set-top box of claim 1, further comprising at least one camera sensor;
wherein the information captured by the set-top box comprises camera imaging information captured using the camera imaging sensor.

20. The set-top box of claim 19, wherein the camera imaging information captured using the camera imaging sensor is used to identify individual viewers using camera physical attribute recognition.

21. The set-top box of claim 1, further comprising at least one thermal imaging sensor;
wherein the information captured by the set-top box comprises thermal imaging information captured using the thermal imaging sensor.

22. The set-top box of claim 21, wherein the thermal imaging information captured using the thermal imaging sensor is used to identify individual viewers using thermal physical attribute recognition.

23. The set-top box of claim 1, further comprising at least one microphone;
wherein the information captured by the set-top box comprises audio information captured using the microphone.

24. The set-top box of claim 23, wherein the audio information captured using the microphone is used to identify individual viewers using voice recognition.

25. The set-top box of claim 1, wherein an inference made based, at least in part, on the information captured by the set-top box is confirmed using additional information.

26. The set-top box of claim 1, wherein an inference made based, at least in part, on the information captured by the set-top box is confirmed using at least one of:
the set-top box;
a remote control associated with the set-top box; and
a mobile application associated with the set-top box, the mobile application running on a mobile device.

27. The set-top box of claim 1, wherein the set-top box is configured to offer the viewer at least one of the following in exchange for providing additional information about the viewer: promotional primary content and a promotional service upgrade.

28. The set-top box of claim 27, wherein the additional information provided by the viewer is used to confirm an inference made based, at least in part, on the information captured by the set-top box.

29. The set-top box of claim 1, wherein the set-top box is configured to capture information about the viewer that is not based on the viewer logging into an account.

30. The set-top box of claim 1, wherein the information captured by the set-top box comprises at least one of:
identification information indicative of an identity of the viewer;
engagement information indicative of engagement of the viewer with at least one of the advertising content and the primary content; and
viewing information indicative of viewing by the viewer of at least one of the advertising content and the primary content.

31. The set-top box of claim 1, wherein the set-top box is provided by a service provider that provides an additional communication service to a home in which the set-top box is installed;
wherein information captured by the service provider in connection with providing the additional communication is combined with the information captured by the set-top box; and
wherein a combination of the information captured by the service provider in connection with providing the additional communication service and the information captured by the set-top box is used in connection with at least one of:
selecting advertising content provided via the set-top box;
selecting advertising content provided via the additional service;
identifying the viewer;

inferring at least one attribute of the viewer; and
confirming an inference made based on only one of the information captured by the service provider in connection with providing the additional communication service and the information captured by the set-top box.

32. The set-top box of claim 31, wherein the additional services comprise at least one of: Internet service, landline telephone service, home security monitoring service, Internet-of-Things (IoT) service, and cellular service.

33. The set-top box of claim 31, wherein the information captured by the service provider in connection with providing the additional communication comprises at least one of: an Internet Protocol address that is accessed using the additional communication service, a telephone number that is called, or called from, using the additional communication service, and a service that is accessed using the additional communication service.

34. The set-top box according claim 1, comprising:
the set-top box configured to determine the match criteria of at least two of the one or more ad profiles matches one or more of the inferred attribute, preference, segment, or generated correlation coefficient of the viewer profile; and
the set-top box configured to rank the two or more ad profiles that match the viewer profile, wherein the ranking is based on a strength of the match or an amount an advertiser associated with ad profile pays for the ad to be played.

35. A method comprising:
capturing, by a set-top box, information about a viewer using the set-top box to display primary content;
generating, by the set-top box, a viewer profile for the viewer based on the captured information;
inferring, by the set-top box, an attribute, preference, or segment of the viewer based on the captured information stored in the viewer profile, the attribute, preference, or segment of the viewer includes at least one of: a sex of the viewer, a race of the viewer, a nationality of the viewer, a native language of the viewer, an occupation of the viewer, a hobby of the viewer, a disease of the viewer, a marital status of the viewer, a health condition of the viewer, a financial condition of the viewer, a consumer preference of the viewer, a dietary preference of the viewer, a political preference of the viewer, a religious preference of the viewer, a primary content preference of the viewer, and an advertising preference of the viewer;
determining, by the set-top box, the accuracy of the attribute, preference, or segment of the viewer by comparing the inferred attribute, preference or segment to a customer profile;
generating, by the set-top box, a correlation coefficient for each inferred attribute, preference, or segment, the correlation coefficient based on the accuracy of the inferred attribute, preference or segment to a viewer profile;
updating, by the set-top box, the viewer profile for the viewer with the determined correlation coefficients for each of the inferred attribute, preference, or segment;
selecting, by the set-top box, advertising content based on one or more ad profiles, each of the one or more ad profiles including match criteria, the match criteria indicating a desired attribute, preference, segment, or correlation coefficient, the selecting of advertising content includes:
determining, by the set-top box, the match criteria of at least one of the one or more ad profiles matches one or more of the inferred attribute, preference, segment, or generated correlation coefficient of the viewer profile;
receiving, by the set-top box, from an access network coupled to the set-top box, primary content and the selected advertising content; and
playing, using the set-top box, the primary content with the selected advertising content inserted therein.

36. The method of claim 35, wherein the set-top box is at least one of: implemented as a part of a home gateway and implemented as a standalone device.

37. The method of claim 35, wherein multiple display devices are coupled to the set-top box.

38. The method of claim 35, wherein at least one display device is coupled to the set-top box via a local area network.

39. The method of claim 35, wherein capturing, by the set-top box, the information about the viewer using the set-top box to display primary content comprises capturing differentiated information about individual ones of a plurality of viewers using the set-top box;
wherein the advertising content is selected based, at least in part, on the captured differentiated information about individual ones of a plurality of viewers of the display device.

40. The method of claim 35, the information captured by the set-top box is communicated to an aggregation entity, the aggregation entity receiving information from a plurality of other service provider set-top boxes of one or more other service provider users to generate one or more user group profiles, wherein the one or more of the user group profiles is used to update the viewer profile.

41. The method of claim 40, wherein the updated viewer profile is used for selecting the advertising content.

42. The method of claim 35, wherein the information captured by the set-top box is used in suggesting primary content to be viewed by the viewer.

43. The method of claim 35, wherein advertising content is selected by at least one of: the set-top box and an entity deployed outside of the set-top box; and
wherein the selected advertising content is inserted into the selected primary content at least one of: at the set-top box and at an entity deployed outside of the set-top box.

44. The method of claim 35, further comprising at least one camera sensor;
wherein the information captured by the set-top box comprises camera imaging information captured using the camera imaging sensor.

45. The method of claim 44, wherein the camera imaging information captured using the camera imaging sensor is used to identify individual viewers using camera physical attribute recognition.

46. The method of claim 44, wherein the thermal imaging information captured using the thermal imaging sensor is used to identify individual viewers using thermal physical attribute recognition.

47. The method of claim 35, wherein the information is captured by the set-top box comprises thermal imaging information captured using a thermal imaging sensor in the set-top box.

48. The method of claim 35, wherein the information captured by the set-top box comprises audio information captured using a microphone in the set-top box.

49. The method of claim 48, wherein the audio information captured using the microphone is used to identify individual viewers using voice recognition.

50. The method of claim 35, wherein an inference made based, at least in part, on the information captured by the set-top box is confirmed using additional information.

51. The method of claim 35, wherein an inference made based, at least in part, on the information captured by the set-top box is confirmed using at least one of:
the set-top box;
a remote control associated with the set-top box; and
a mobile application associated with the set-top box, the mobile application running on a mobile device.

52. The method of claim 35, further comprising offering the viewer at least one of the following in exchange for providing additional information about the viewer: promotional primary content and a promotional service upgrade.

53. The method of claim 52, wherein the additional information provided by the viewer is used to confirm an inference made based, at least in part, on the information captured by the set-top box.

54. The method of claim 35, wherein the set-top box is configured to capture information about the viewer that is not based on the viewer logging into an account.

55. The method of claim 35, wherein the information captured by the set-top box comprises at least one of:
identification information indicative of an identity of the viewer;
engagement information indicative of engagement of the viewer with at least one of the advertising content and the primary content; and
viewing information indicative of viewing by the viewer of at least one of the advertising content and the primary content.

56. The method of claim 35, wherein the set-top box is provided by a service provider that provides an additional communication service to a home in which the set-top box is installed;
wherein information captured by the service provider in connection with providing the additional communication is combined with the information captured by the set-top box;
wherein a combination of the information captured by the service provider in connection with providing the additional communication service and the information captured by the set-top box is used in connection with at least one of:
selecting advertising content provided via the set-top box;
selecting advertising content provided via the additional service;
identifying the viewer;
inferring at least one attribute of the viewer; and
confirming an inference made based on only one of the information captured by the service provider in connection with providing the additional communication service and the information captured by the set-top box.

57. The method of claim 56, wherein the additional services comprise at least one of: Internet service, landline telephone service, home security monitoring service, Internet-of-Things (IoT) service, and cellular service.

58. The method of claim 56, wherein the information captured by the service provider in connection with providing the additional communication comprises at least one of: an Internet Protocol address that is accessed using the additional communication service, a telephone number that is called using the additional communication service, and a service that is accessed using the additional communication service.

59. The set-top box according to claim 1, wherein the attribute, preference, or segment of the viewer is inferred using machine learning.

60. The method according to claim 35, wherein the attribute, preference, or segment of the viewer is inferred using machine learning.

61. The method according to claim 35, comprising:
determining the match criteria of at least two of the one or more ad profiles matches one or more of the inferred attribute, preference, segment, or generated correlation coefficient of the viewer profile; and
ranking the two or more ad profiles that match the viewer profile, wherein the ranking is based on a strength of the match or an amount an advertiser associated with ad profile pays for the ad to be played.

* * * * *